United States Patent
Simonchik et al.

(10) Patent No.: US 11,611,581 B2
(45) Date of Patent: Mar. 21, 2023

(54) METHODS AND DEVICES FOR DETECTING A SPOOFING ATTACK

(71) Applicant: ID R&D, Inc., New York, NY (US)

(72) Inventors: Konstantin Konstantinovich Simonchik, Saint Petersburg (RU); Anton Andreevich Pimenov, Saint Petersburg (RU); Aleksandr Alekseevich Alenin, Veliky Novgorod (RU)

(73) Assignee: ID R&D, Inc., New York, NY (US)

( * ) Notice: Subject to any disclaimer, the term of this patent is extended or adjusted under 35 U.S.C. 154(b) by 380 days.

(21) Appl. No.: 17/003,627

(22) Filed: Aug. 26, 2020

(65) Prior Publication Data

US 2022/0070207 A1  Mar. 3, 2022

(51) Int. Cl.
*H04L 9/40* (2022.01)
*G06F 17/14* (2006.01)
*G10L 15/16* (2006.01)

(52) U.S. Cl.
CPC ........ *H04L 63/1466* (2013.01); *G06F 17/142* (2013.01); *G10L 15/16* (2013.01)

(58) Field of Classification Search
CPC ... H04L 63/1466; G06F 17/142; G06F 30/27; G10L 15/16; G10L 25/30; G10L 25/51; G10L 17/18; G06N 3/02
See application file for complete search history.

(56) References Cited

U.S. PATENT DOCUMENTS 5,555,320 A    9/1996   Irie et al.
10,938,852 B1 *  3/2021   Streit ............... G06V 10/82
(Continued)

FOREIGN PATENT DOCUMENTS

WO    9923643 A1    5/1999
WO    0229785 A1    4/2002

OTHER PUBLICATIONS

Balamurali, B., Kinwah Edward Lin, S. Lui, J. Chen and Dorien Herremans. Towards robust audio spoofing detection: a detailed comparison of traditional and learned features. IEEE Access 7 (2019): 84229-84241.
(Continued)

*Primary Examiner* — Ponnoreay Pich
*Assistant Examiner* — Mudasiru K Olaegbe
(74) *Attorney, Agent, or Firm* — Millen, White, Zelano & Branigan, P.C.; William Nixon

(57) ABSTRACT

Methods and devices for detecting a spoofing attack are provided. The method includes receiving a speech signal; applying a Fast Fourier Transform (FFT) to the speech signal to extract FFT features therefrom and feeding the extracted FFT features to a pre-trained deep neural network to assign a first confidence score to the speech signal; applying a Discrete cosine transform (DCT) to the speech signal to extract DCT features therefrom and feeding the extracted DCT features to a pre-trained deep neural network to assign a second confidence score to the speech signal; applying a pre-trained deep convolutional network (DCN) based on an end-to-end architecture to the speech signal to assign a third confidence score to the speech signal; computing a total confidence score based on the assigned confidence scores; and comparing the computed total confidence score to a predefined threshold to detect whether the received speech signal is spoofed.

8 Claims, 5 Drawing Sheets

(56) References Cited

U.S. PATENT DOCUMENTS

| | | | |
|---|---|---|---|
| 2015/0088509 A1 | 3/2015 | Gimenez et al. | |
| 2017/0148444 A1* | 5/2017 | Bocklet | G10L 15/01 |
| 2018/0174576 A1* | 6/2018 | Soltau | G10L 21/10 |
| 2018/0190280 A1* | 7/2018 | Cui | G10L 15/16 |
| 2019/0005976 A1* | 1/2019 | Peleg | G06V 40/161 |
| 2019/0043477 A1* | 2/2019 | Bang | G10L 15/02 |
| 2019/0043489 A1* | 2/2019 | Lopatka | G06N 3/04 |
| 2020/0302667 A1* | 9/2020 | del Val Santos | G06N 3/0445 |

OTHER PUBLICATIONS

Sahidullah, M., Delgado, H., Todisco, M., Kinnunen, T., Evans, N., Yamagishi, J., & Lee, K. (2019). Introduction to Voice Presentation Attack Detection and Recent Advances. ArXiv, abs/1901.01085. (pp. 1-41).

Dargie, W. Analysis of Time and Frequency Domain Features of Accelerometer Measurements.2009 Proceedings of 18th International Conference on Computer Communications and Networks (2009): 1-6.

Wang, Xin et al. ASVspoof 2019: A large-scale public database of synthesized, converted and replayed speech. Comput. Speech Lang. 64 (2020): 101114.

Shafi, M., Khan, M.S., Sattar, N., Rizwan, M., Baba, A.A., & Ghani, R. (2012). Transform Based Speech Enhancement Using DCT Based MMSE Filter,& Its Comparison With DFT Filter. pp. 47-52.

Soon, I., Koh, S.N., & Yeo, C. (1998). Noisy speech enhancement using discrete cosine transform. Speech Commun., 24, 249-257.

Singh, N., Khan, R., & Bhimrao, B. (2015). Speaker Recognition and Fast Fourier Transform, pp. 530-534.

Aytar, Y. et al. SoundNet: Learning Sound Representations from Unlabeled Video. NIPS (2016). (pp. 1-9).

Ernawan, F., Abu, N.A., & Suryana, N. (2011). Spectrum analysis of speech recognition via discrete Tchebichef transform. International Conference on Graphic and Image Processing. Proc. of SPIE vol. 8285 82856L—pp. 1-8.

Yang, T. (2012). The Algorithms of Speech Recognition : programming and simulating in MATLAB. Bachelors Thesis in Electronics—pp. 1-71.

Khayam, S.A. (2003). Michigan State University; The Discrete Cosine Transform ( DCT ) : Theory and Application 1. ECE 802-602:information Theory and Coding ;pp. 1-32.

Chaudhary K. Understanding Audio data, Fourier Transform, FFT and Spectrogram features for a Speech Recognition System. An introduction to audio data analysis (sound analysis) using python (2020). Retrieved from https://towardsdatascience.com/understanding-audio-data-fourier-transform-fft-spectrogram-and-speech-recognition-a4072d228520 Sep. 2020; pp. 1-13.

Halder C. et al. Writer Verification on Bangla Handwritten Characters. // Chaki, R., Cortesi, A., Saeed, K., Chaki, N. Advanced Computing and Systems for Security: vol. 2. (2016), p. 60-66.

Johnson D. Electrical Engineering: 5.10: Spectrograms.The LibreTexts (2020). (pp. 1-4).

Marshall D. The Discrete Cosine Transform (DCT) (2001). retrieved from internet on Sep. 10, 2020 URL: https://users.cs.cf.ac.uk/Dave.Marshall/Multimedia/node231.html (pp. 1-3).

Husain M. et al. Speech Based Arithmetic Calculator Using Mel-Frequency Cepstral Coefficients and Gaussian Mixture Models. //Proceedings of 3rd International Conference on Advanced Computing, Networking and Informatics: ICACNI 2015, vol. 1. pp. 209-218.

* cited by examiner

METHODS AND DEVICES FOR DETECTING A SPOOFING ATTACK

FIELD OF THE INVENTION

The present invention generally relates to anti-spoofing systems, and more particularly to a speech-processing devices and corresponding methods for detecting a spoofing attack.

BACKGROUND OF THE INVENTION

For human being voice is the most natural method to share their thoughts and information to each other. A human voice or speech signal as naturally produced by acoustically exciting cavities of a human mouth and a human nose contains a number of required information about an individual, thereby allowing recognition of the individual.

Nowadays, automatic speaker verification (ASV) systems are one of the most natural and convenient biometric authentication systems and aim to recognize individuals using samples of the human voice or speech signal. Most ASV systems operate on estimates of the spectral characteristics of voice in order to recognize individual speakers. ASV technology has matured in recent years and now finds application in a growing variety of real-world authentication scenarios involving both logical and physical access.

In scenarios, ASV technology can be used for remote person authentication via the Internet or traditional telephony. In many cases, ASV serves as a convenient and efficient alternative to more conventional password-based solutions, one prevalent example being person authentication for Internet and mobile banking. Scenarios include the use of ASV to protect personal or secure/sensitive facilities, such as domestic and office environments. With the growing, widespread adoption of smartphones and voice-enabled smart devices, such as intelligent personal assistants all equipped with at least one microphone, ASV technology stands to become even more ubiquitous in the future.

While recent times have seen great strides in the performance of ASV systems, it is now accepted that the automatic speaker verification (ASV) systems are vulnerable to manipulation through spoofing attacks (also referred to in the prior art as "presentation attacks"). Spoofing or presentation attacks are performed on a biometric system at the sensor or acquisition level to bias score distributions toward those of genuine clients, thus provoking increases in the false acceptance rate (FAR).

There are at least four major classes of spoofing attacks: impersonation, replay, speech synthesis, and voice conversion.

In speech or mimicry attacks, an intruder speaker intentionally modifies his or her speech to sound like the target speaker. Impersonators are likely to copy lexical, prosodic, and idiosyncratic behavior of their target speakers presenting a potential point of vulnerability concerning speaker recognition systems.

Replay attacks refer to the use of pre-recorded speech from a target speaker, which is then replayed through a playback device to feed a system microphone. These attacks require no specific expertise nor sophisticated equipment, thus they are easy to implement. Replay is a relatively low-technology attack within the grasp of any potential attacker even without specialized knowledge in speech processing. Prior art documents report significant increases in error rates when using replayed speech. Even if replay attacks may present a genuine risk to ASV systems, the use of prompted-phrase has the potential to mitigate the impact.

Speech synthesis commonly referred to as text-to-speech (TTS) is a technique for generating intelligible, natural sounding artificial speech for any arbitrary text. Speech synthesis is used widely in various applications including in-car navigation systems, e-book readers, voice-over for the visually impaired and communication aids for the speech impaired. More recent applications include spoken dialogue systems, communicative robots, singing speech synthesizers and speech-to-speech translation systems.

Typical speech synthesis systems have two main components: text analysis followed by speech waveform generation, which are sometimes referred to as the front-end and back-end, respectively. In the text analysis component, input text is converted into a linguistic specification consisting of elements such as phonemes. In the speech waveform generation component, speech waveforms are generated from the produced linguistic specification. There are emerging end-to-end frameworks that generate speech waveforms directly from text inputs without using any additional modules.

Finally, voice conversion (VC) is a spoofing attack against automatic speaker verification by using an attacker's natural voice converted to that of the target. It aims to convert one speaker's voice towards that of another and is a sub-domain of voice transformation. Unlike TTS, which requires text input, voice conversion operates directly on speech inputs. However, speech waveform generation modules such as vocoders, may be the same as or similar to those for TTS. A major application of VC is to personalize and create new voices for TTS synthesis systems and spoken dialogue systems. Other applications include speaking aid devices that generate more intelligible voice sounds to help people with speech disorders, movie dubbing, language learning, and singing voice conversion.

In order to improve the security of ASV systems, many antispoofing countermeasures have been developed. In the front-end domain, much research has been conducted on finding effective features which would allow distinguishing a spoofed speech signal from a genuine speech signal. Published prior art documents show that dynamic acoustic features work more effectively than static ones. In the back-end domain, Gaussian mixture model (GMM) and Deep neural networks (DNNs) are the two most popular types of classifiers used for detecting a variety of specific spoofing attack types. Three scoring methods (a probabilistic normalization, a linear regression and a support vector machine) are commonly used for the Gaussian Mixture Model (GMM).

Hui Tang et al. notes in his article "The GMM and I-Vector Systems Based on Spoofing Algorithms for Speaker Spoofing Detection" (14th Chinese Conference, Zhuzhou, China, Oct. 12-13, 2019 Proceedings, Biometric Recognition, Z. Sun et al. (Eds.): CCBR 2019, LNCS 11818, pp. 502-510, 2019) that the GMM classifier with the Support Vector Machines (SVM) scoring method based on different spoofing algorithms obtains the best performance on the evaluation set with Equal Error Rate (EER) of 7.03%.

Meanwhile, many different known GMM-based systems for detecting spoofing attacks are described in the art, e.g., in WO 2002029785 A1 as published on 11 Apr. 2002, U.S. Pat. No. 5,555,320 A as published on 10 Sep. 19996, WO 9923643 as published on 14 May 1999, and US 20150088509 A1 as published on 26 Mar. 2015. The known GMM-based systems that try to detect specific spoofing attacks typically make use of prior knowledge about the used spoofing algorithm. Generally, a countermeasure used by the known GMM-based systems for detecting a spoofing attack in a speech signal consists of two parts: a first part dealing with features extraction and pre/postprocessing of the speech signal, and a second part consisting of a model that determines whether the speech signal is genuine or spoofed.

Thus, the known anti-spoofing systems, including the above-mentioned GMM-based systems for detecting spoofing attacks, may be generally regarded as effective only for a specific spoofing attack type known in the art or a limited number of spoofing attack types known in the art and, therefore, they cannot be effectively used for detecting different spoofing attack types or unknown spoofing attacks (new kinds or classes of speech presentation attacks). In other words, the known anti-spoofing systems are trained with a specific type or a limited number of specific types of spoofing attacks and fail to generalize this for other types of spoofing attacks, varying spoofing attacks or unknown (new) types of spoofing attacks. As an example, detecting the converted speech created with an "unknown" method or the playback voice recording in a new replay session will be difficult or impossible for the known anti-spoofing systems. However, generality and performance of the anti-spoofing systems are important requirements for their application in the real practice.

Therefore, developing a universal anti-spoofing system being independent of spoofing attack types is an important concern in the art.

SUMMARY OF THE INVENTION

It is an object of the present invention to improve efficiency of spoofing attacks detection.

In a first aspect of the present invention, there is provided a method of detecting a spoofing attack, the method being executed on a computing device. The provided method comprises receiving a speech signal; applying a Fast Fourier Transform (FFT) to the speech signal to extract FFT features therefrom and feeding the extracted FFT features to a pre-trained deep neural network to assign a first confidence score to the speech signal; applying a Discrete cosine transform (DCT) to the speech signal to extract DCT features therefrom and feeding the extracted DCT features to a pre-trained deep neural network to assign a second confidence score to the speech signal; applying a pre-trained deep convolutional network (DCN) based on an end-to-end architecture to the speech signal to assign a third confidence score to the speech signal; computing a total confidence score based on the assigned confidence scores; and comparing the computed total confidence score to a predefined threshold to detect whether the received speech signal is spoofed.

In an embodiment of the present invention, the provided method further comprises dividing the received speech signal into frames.

In one embodiment of the present invention, applying the Fast Fourier Transform (FFT) to the speech signal includes applying the Fast Fourier Transform (FFT) to each speech signal frame, wherein the FFT features fed to the pre-trained deep neural network are a FFT feature matrix obtained by concatenating the frequency-domain feature vectors each corresponding to one of the speech signal frames.

In another embodiment of the present invention, applying the Discrete cosine transform (DCT) to the speech signal includes applying the Discrete cosine transform (DCT) to each speech signal frame, wherein the DCT features fed to the pre-trained deep neural network are a DCT feature matrix obtained by concatenating the frequency-domain feature vectors each corresponding to one of the speech signal frames.

In various embodiments of the present invention, the end-to-end architecture used in the deep convolutional network (DCN) is the SoundNet architecture.

In a second aspect of the present invention, a speech-processing device for detecting a spoofing attack is provided. The provided speech-processing device comprises a communication module for receiving a speech signal; and a spoofing-detection module connected to the communication module to receive the speech signal therefrom and performing at least the following operations: applying a Fast Fourier Transform (FFT) to the speech signal to extract FFT features therefrom and feeding the extracted FFT features to a pre-trained deep neural network to assign a first confidence score to the speech signal; applying a Discrete cosine transform (DCT) to the speech signal to extract DCT features therefrom and feeding the extracted DCT features to a pre-trained deep neural network to assign a second confidence score to the speech signal; applying a pre-trained deep convolutional network (DCN) based on an end-to-end architecture to the speech signal to assign a third confidence score to the speech signal; computing a total confidence score based on the received confidence scores; and comparing the computed total confidence score to a predefined threshold to detect whether the received speech signal is spoofed.

In a third aspect of the present invention, another speech-processing device for detecting a spoofing attack is provided. The provided speech-processing device comprises a communication module for receiving a speech signal;

a first spoofing-detection module connected to the communication module to receive the speech signal therefrom and performing the following operations:
  applying a Fast Fourier Transform (FFT) or a Discrete cosine transform (DCT) to the speech signal to extract a first set of signal features therefrom;
  feeding the extracted first set of signal features to a pre-trained deep neural network to assign a first confidence score to the speech signal; and
  comparing the assigned first confidence score to a predefined threshold to detect whether the received speech signal is spoofed;

a second spoofing-detection module connected to the communication module to receive the speech signal therefrom and connected to the first spoofing-detection module to receive the assigned first confidence score therefrom when the speech signal is detected by the first spoofing-detection module as not spoofed, wherein the second spoofing-detection module performs the following operations:
  applying another transform of the Fast Fourier Transform (FFT) and the Discrete cosine transform (DCT) to the speech signal to extract a second set of signal features therefrom; and
  feeding the extracted second set of signal features to a pre-trained deep neural network to assign a second confidence score to the speech signal;
  computing a first total confidence score based on the received first confidence score and the assigned second confidence score;
  comparing the computed first total confidence score to a predefined threshold to detect whether the received speech signal is spoofed;

a third spoofing-detection module connected to the communication module to receive the speech signal therefrom and connected to the second spoofing-detection module to receive the computed first total confidence score therefrom when the speech signal is detected by the second spoofing-detection module as not spoofed, wherein the third spoofing-detection module performs the following operations:

applying a pre-trained deep convolutional network (DCN) based on an end-to-end architecture to the speech signal to assign a third confidence score to the speech signal;

computing a second total confidence score based on the received first total confidence score and the assigned third confidence score;

comparing the computed second total confidence score to a predefined threshold to detect whether the received speech signal is spoofed.

In a fourth aspect of the present invention, another method of detecting a spoofing attack is provided. The provided method according to the fourth aspect of the present invention comprises:

receiving a speech signal;

applying a Fast Fourier Transform (FFT) or a Discrete cosine transform (DCT) to the speech signal to extract a first set of signal features therefrom and feeding the extracted first set of signal features to a pre-trained deep neural network to assign a first confidence score to the speech signal;

comparing the assigned first confidence score to a predefined threshold to detect whether the received speech signal is spoofed;

if the speech signal is detected as not spoofed, applying another transform of the Fast Fourier Transform (FFT) and the Discrete cosine transform (DCT) to the speech signal to extract a second set of signal features therefrom and feeding the extracted second set of signal features to a pre-trained deep neural network to assign a second confidence score to the speech signal;

computing a first total confidence score based on the assigned first confidence score and the assigned second confidence score;

comparing the computed first total confidence score to a predefined threshold to detect whether the received speech signal is spoofed;

if the speech signal is detected as not spoofed, applying a pre-trained deep convolutional network (DCN) based on an end-to-end architecture to the speech signal to assign a third confidence score to the speech signal;

computing a second total confidence score based on the computed first total confidence score and the assigned third confidence score;

comparing the computed second total confidence score to a predefined threshold to detect whether the received speech signal is spoofed.

The present invention according to any of the above-disclosed aspects improves accuracy and quality of user authentication by a free-text keystroke dynamics analysis and provides low performance requirements that allows implementing authentication methods and authentication systems in low-power mobile devices.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the drawings, wherein:

DETAILED DESCRIPTION OF THE PREFERRED EMBODIMENTS

The present invention will now be described more fully with reference to the accompanying drawings, in which example embodiments of the present invention are illustrated. The subject matter of this disclosure may, however, be embodied in many different forms and should not be construed as being limited to the embodiments set forth herein.

The following example embodiments of the present invention are provided for detecting spoofing attacks when human speech signals are used. However, the present invention is not limited to processing human speech signals; in particular, the present invention is also applicable for detecting spoofing attacks when other sound or voice signals are used.

Figure 1:
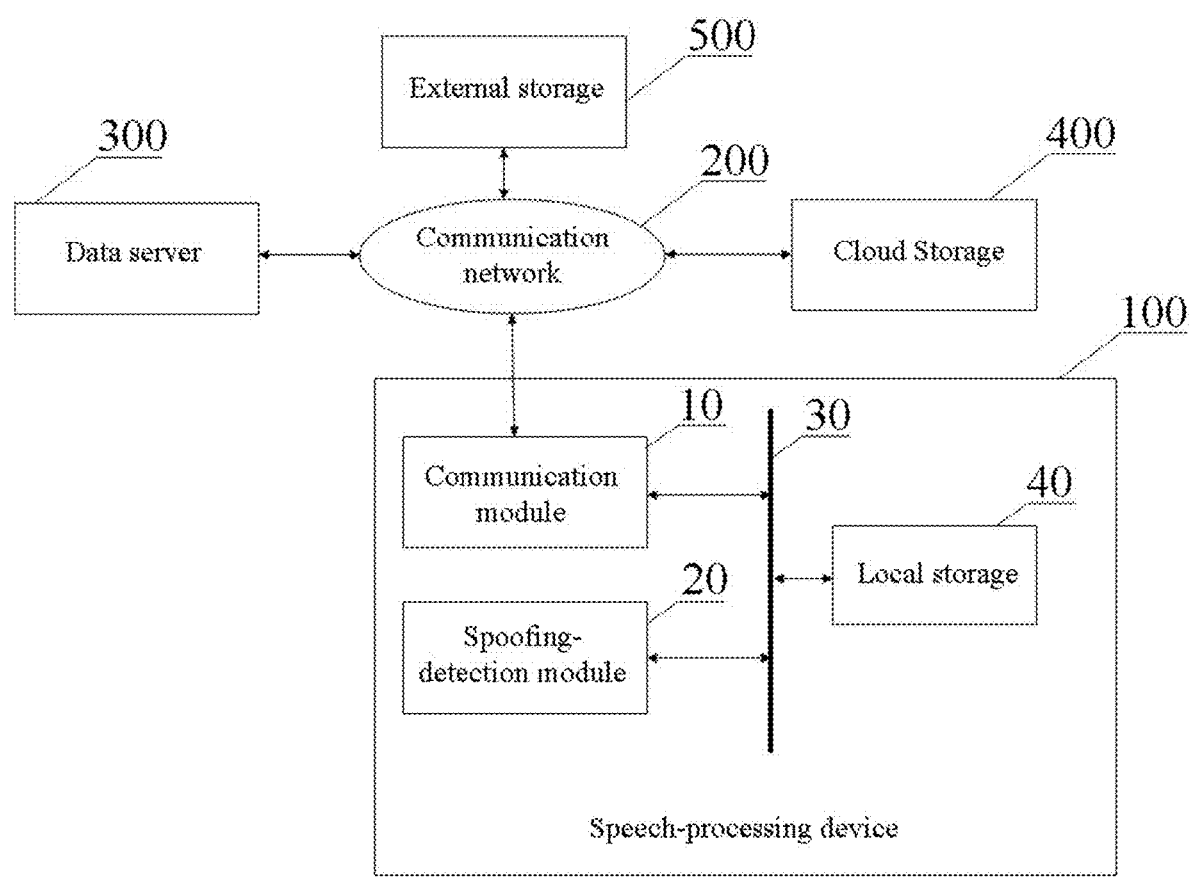
FIG. 1 shows a block diagram of a speech-processing device for detecting a spoofing attack according to a first aspect of the present invention.

FIG. 1 is a block diagram illustrating a speech-processing device 100 according to a first aspect of the present invention. The speech-processing device 100 is intended to detect different spoofing attacks and comprised of two main functional modules: a communication module 10 and a spoofing-detection module 20. The speech-processing device 100 also comprises a local data storage 40 and a communication bus 30, wherein the spoofing-detection module 20 is communicatively coupled to the communication module 10 via the communication bus 30, and the communication module 10 and the spoofing-detection module 20 are each communicatively coupled to the local data storage 40.

Functionalities of the communication module 10 and spoofing-detection module 20 will be fully described below with reference to FIG. 1.

The communication module 10 may be communicatively connected via a communication network 200 to a data server 300, a cloud storage 400, external storage 500 or other similar devices used for storing speech signals to receive therefrom at least one speech signal to be processed by the speech-processing device 100 for spoofing attack detection. In one embodiment of the present invention, the communication module 10 may be connected directly to the data server 300, a cloud storage 400, and external storage 500 in a wired or wireless manner.

The communication module 10 may be implemented as a network adapter provided with slots appropriate for connecting physical cables of desired types thereto if wired connections are provided between the speech-processing device 100 and any external devices mentioned in the present document or as a network adapter in form of WiFi-adaptor, 3G/4G/5G-adaptor, LTE-adaptor or any other appropriate adaptor supporting any known wireless communication technology if wireless connections are provided between the speech-processing device 100 and any external devices mentioned in the present document. In an embodiment of the present invention, the communication module 10 may be implemented as a network adaptor supporting a combination of the above-mentioned wire or wireless communication technologies depending on types of connections provided between the speech-processing device 100 and any external devices mentioned in the present document.

Each speech signal received by the communication module 10 is transmitted via the communication bus 30 directly to the spoofing-detection module 20 to allow the speech signal to be processed by the spoofing-detection module 20 to determine whether the speech signal is spoofed or genuine. In another embodiment of the present invention, the speech signal received by the communication module 10 may be transmitted via the communication bus 30 to the local data storage 40 to be stored therein, and the spoofing-detection module 20 may access the local data storage 40 via the communication module 10 to retrieve the previously stored speech signals to further process them for spoofing attack detection.

The spoofing-detection module 20 and any other processing modules mentioned in the present document may be each implemented as a single processor, such as a common processor or a special-purpose processor (e.g., a digital signal processor, an application-specific integrated circuit, or the like). For example, the spoofing-detection module 20 may be in the form of a central processing unit of the below-mentioned common computer which may be the implementation of the speech-processing device 100.

In some embodiments of the present invention, the communication module 10 in the speech-processing device 100 may further communicatively connected to a packet capture device (not shown) in wire or wireless manner, in particular via the communication network 200. The packet capture device may be connected to the communication network 200 to capture data packets transmitted via the communication network 200 (network traffic) and to transmit the captured data packets to the communication module 10; the spoofing-detection module 20 may further comprises a filtering or analyzing module (not shown) communicatively connected to the communication module 10 and the spoofing-detection module 20 via the communication bus 30 to process the data packets received by the communication module 10. The analyzing module may be further configured or programmed to extract all files comprised in the data packets received from the communication module 10 and to analyze each of the extracted files to identify its format, wherein the analyzing module is further configured or programmed to transmit each file having any audio format known in the art, i.e. each file corresponding to a voice or speech signal, to the spoofing-detection module 20 via the communication bus 30 for spoofing attack detection.

The speech-processing device 100 may be in the form of a computing device comprised of a combination of a hardware and software or a common computer having a structure known for those skilled in the art.

In an embodiment of the present invention, the speech-processing device 100 may be implemented as a single computer server, such as «Dell™ PowerEdge™» server running the operating system «Ubuntu Server 18.04». In some embodiments of the present invention, the speech-processing device 100 may be in the form of a table computer, laptop, netbook, smartphone, tablet and any other electronic or computing device appropriate for solving the above-mentioned prior art problems. In other embodiments of the present invention, the speech-processing device 100 may be implemented in any other suitable hardware, software, and/or firmware, or a combination thereof. A particular implementation of the speech-processing device 100 is not limited by the above-mentioned examples.

The local data storage 40 stores executable program instructions or commands allowing the operation of functional modules integrated to the speech-processing device 100 to be controlled, wherein said functional modules are the communication module 10, the spoofing-detection module 20 and any other functional module mentioned in the present document as a part of the speech-processing device 100. Meanwhile, such executable program instructions or commands as stored in the local data storage 40 also allow the functional modules to implement their functionalities. Furthermore, the local data storage 40 stores different additional data used by the functional modules to provide their outputs.

The local data storage 40 may be realized as a memory, a hard disk drive or any appropriate long-term storage. For example, the local data storage 40 may be in the form of a data storage of the above-mentioned common computer which may be the implementation of the speech-processing device 100.

Each speech signal received by the spoofing-detection module 20 from the communication module 10 or retrieved by the spoofing-detection module 20 from the local data storage 40 (depending on a particular embodiment of the present invention) is processed by the spoofing-detection module 20 in the below-described manner for extracting different sets of audio features therefrom, thereby allowing the processed speech signal to be detected by the spoofing-detection module 20 as spoofed or genuine by preforming the below operations.

Figure 2:
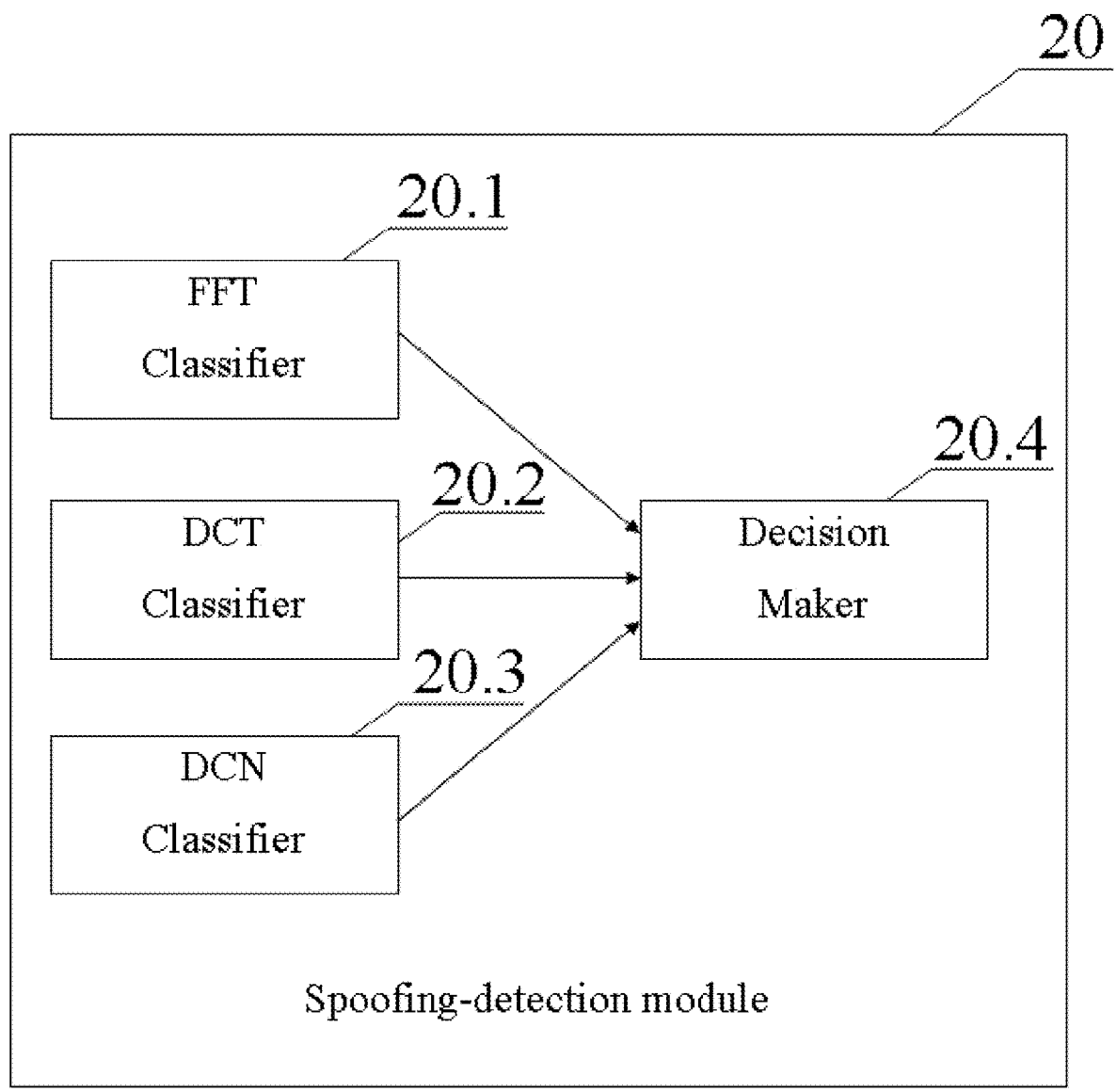
FIG. 2 shows a block diagram of a spoofing-detection module.

As shown in FIG. 2, the spoofing-detection module 20 comprises a Fast Fourier Transform (FFT) classifier 20.1, a Discrete Cosine Transform (DCT) classifier 20.2 and a Deep convolutional network (DCN) classifier 20.3, wherein each of the classifiers 20.1, 20.2, 20.3 receives the speech signal transmitted from the communication module 10 to the spoofing-detection module 20 as an input for simultaneously processing the input. The spoofing-detection module 20 further comprises a decision maker 20.4 connected to each of the FFT classifier 20.1, DCT classifier 20.2 and the DCN classifier 20.3.

The FFT classifier 20.1 is configured to perform the following main actions or operations:

(i) segmenting or dividing the received speech signal into overlapping or non-overlapping frames;

(ii) applying a Fast Fourier Transform (FFT) to the each speech signal frame to extract corresponding FFT features therefrom, wherein the FFT features extracted for each speech signal frame are presented as a FFT feature vector carrying FFT features of the speech signal frame and having a dimensionality of 64, 128 or 256;

(iii) concatenating the FFT feature vectors, each FFT feature vector corresponding to a particular speech signal frame, into a FFT feature matrix;

(iv) feeding the FFT feature matrix corresponding to the speech signal to a pre-trained deep neural network (DNN) to assign a confidence score to the speech signal based on the FFT features presented in the fed FFT feature matrix.

Please note that the confidence score assigned by the FFT classifier 20.1 is referred to in the present document as a first confidence score to distinguish it from other confidence scores assigned by other classifiers disclosed therein, and the deep neural network (DNN) used in the FFT classifier 20.1 is referred to in the present document as a first deep neural network (a first DNN) to distinguish it from another deep neural network (DNN) used by the below-described DCT classifier 20.2.

Unless the context otherwise required, the FFT features extracted from the received speech signal by the FFT classifier 20.1 may be also referred to in the present document as frequency-domain features, spectral features or FFT features, and the feature matrix obtained by the FFT classifier 20.1 may be also referred to in the present document as a first frequency-domain feature matrix, a first spectral feature matrix or a FFT feature matrix.

In one embodiment of the present invention, the FFT classifier 20.1 may be divided into a group of interconnected functional sub-modules according to the above-mentioned functionalities of the FFT classifier 20.1: a framing sub-module configured to perform the above operation (i) of the FFT classifier 20.1, and a feature extraction sub-module connected to the framing sub-module and configured to perform the above operations (ii), (iii) of the FFT classifier 20.1, and a score assignment sub-module connected to the feature extraction sub-module and configured to perform the above operation (iv) of the FFT classifier 20.1.

It is noted that the speech signal received by the FFT classifier 20.1 generally varies with time and is statistically non-stationary in nature. In order to extract stable acoustic features from the speech signal as performed by the FFT classifier 20.1 during the above operation (ii) it is required for the FFT classifier 20.1 during the operation (i) to segment or divide the speech signal into successive frames of length typically of 20-30 ms (since a human cannot generally speak more than one phoneme within the time window of 20-30 ms). In this short time window, the speech signal will be considered as reasonably stationary or quasi stationary. In particular, accuracy of the features extracted by the FFT classifier 20.1 depends on the optimum length of the speech signal frame. If the length of the speech signal frame is too small, some temporal characteristics of the speech signal may be lost. The information loss due to quick transitions between successive frames can be controlled by over-lapping successive frames with a duration of about 25-75% of the frame length (the preferred frame overlapping is 30%-50% of the frame length). Therefore, a length of the speech signal frames as obtained by the FFT classifier 20.1 during the operation (i) is to be chosen such that each speech signal frame is not so long that significant signal variations are retained within the speech signal frame, but not so short that the spectral character of the speech signal is lost.

In one embodiment of the present invention, the speech signal to be processed by the FFT classifier 20.1 may be divided by the FFT classifier 20.1 into overlapping, equal-length frames. In another embodiment of the present invention, the speech signal to be processed by the FFT classifier 20.1 may be divided by the FFT classifier 20.1 into non-overlapping, equal-length frames.

The above operation (ii) performed by the FFT classifier 20.1 includes calculating a Fast Fourier Transform (FFT) for each speech signal frame as obtained as a result of the operation (i) performed by the FFT classifier 20.1, wherein the extracted FFT features are actually a first set of speech signal features used by the spoofing-detection module 20 to make a final decision on whether the processed speech signal is spoofed or genuine.

It is to note that the Fast Fourier Transform (FFT) used by the FFT classifier 20.1 for performing the operation (ii) is an efficient algorithm which can be used for calculating Discrete Fourier Transform (DFT). FFT is generally applied in order to convert time-domain discrete signals x(j) into the frequency domain X(k). The sequence of N complex numbers $x_0, \ldots, x_{N-1}$ represents a given time-domain speech signal. The FFT of x(j) is defined by the following equation:

$$X(k) = \sum_{j=1}^{N} x(j) e^{\frac{-2\pi i}{N}(j-1)(k-1)},$$

where k=0, ..., N−1, x(j) is the sample at time index j, and i is the imaginary number $\sqrt{-1}$. X(k) is a vector of N values at frequency index k corresponding to the magnitude of the sine waves resulting from the decomposition of the time indexed speech signal.

The Fast Fourier Transform (FFT) applied by the FFT classifier 20.1 to each speech signal frame allows the speech signal frame to be transformed or converted from the time domain to the frequency domain, i.e. allows decomposition of the speech signal frame into its constituent frequencies, wherein the Fast Fourier Transform (FFT) does not just give the frequencies presented in the signal speech frame, but also gives the magnitude (amplitude) of each frequency presented in the signal speech frame.

The transformation of the speech signal frame from the time-domain (only shows the loudness of sound wave changing with time, i.e. only amplitude being the amplitude of air particles which are oscillating because of the pressure change in the atmosphere due to sound) to the frequency spectrum allows working in the frequency domain and, therefore, using the frequency spectrum of the speech signal frame as a substitute of waveform. The frequency domain provides much more information about each of the speech signal frames obtained by the FFT classifier 20.1.

Therefore, the FFT algorithm used in the FFT classifier 20.1 converts the speech signal to a sequence or set of FFT feature vectors, each FFT feature vector carrying frequency-domain features of a corresponding speech signal frame, wherein said FFT feature vector is actually a spectral amplitude vector. In other words, the FFT algorithm used in the FFT classifier 20.1 returns or outputs a set of amplitudes of the frequencies found in each frame comprised in the speech signal.

As an example, if the speech signal has a sampling rate of 16k (i.e. the speech signal was recorded or sampled with a sampling frequency of 16k meaning that 16000 amplitudes were captured every second when recording the speech signal), and each of the speech signal frames has a length of 20 ms, and a frame overlapping is 50% among the speech signal frames, each frame will have (16000*20*0.001)=320 amplitudes, wherein for the frame overlapping of 50% it is required to go forward by (320/2)=160 amplitude values (a stride value is 160) to get to the next speech signal frame. Thus, an output of the FFT algorithm will be a list of complex numbers (size=frame size/2) which represent amplitudes of different frequencies within the speech signal frame. If the frame size is 320, we will get a list of 160 amplitudes of frequency bins which represent frequencies from 0 Hz— 8 kHz (when the sampling rate is 16k).

Then, the FFT classifier 20.1 performs the operation (iii), in particular concatenates the FFT feature vectors into a resulting feature matrix representing a spectrogram of the speech signal, the FFT feature vectors being obtained as a result of the operation (ii) performed by the FFT classifier 20.1 and each corresponding to a particular speech signal frame, wherein matrix rows and columns will actually represent a frame number and a frequency bin while values will actually represent the strength of the frequencies.

When the above operation (iv) of the FFT classifier 20.1 is performed, the FFT feature matrix corresponding to the speech signal is to be fed to the first deep neural network (DNN) to assign the first confidence score to the speech signal based on the FFT features presented in the fed FFT feature matrix, wherein the used first deep neural network (DNN) is to be pre-trained on pre-extracted FFT features of a plurality of spoofed speech signals and on pre-extracted FFT features of a plurality of genuine speech signals to detect which FFT features of the pre-extracted FFT features influence the spoofed speech signal and the genuine speech signal and to estimate the strength of said influence. Therefore, the pre-trained first DNN used in the FFT classifier 20.1 is configured to analyze or process the received FFT features of the speech signal to find out whether the speech signal is to be regarded rather as spoofed than genuine or vice versa and to assign the first confidence score in a range of [0; 1] depending on the FFT features processed. If the first confidence score assigned by the FFT classifier 20.1 is equal to 0, it means that the FFT features correspond to a completely spoofed speech signal. And vice versa, if the first confidence score assigned by the FFT classifier 20.1 is equal to 1, it means that the FFT features correspond to a completely genuine speech signal. As an example, if the first confidence score assigned by the FFT classifier 20.1 is equal to 0.2323 (corresponds to a low confidence level), it means that the speech signal having the FFT features processed by the first DNN in the FFT classifier 20.1 is much rather spoofed than genuine since the value of the assigned first confidence score is much closer to 0 than to 1.

Therefore, as described above, the FFT classifier 20.1 allows analyzing the amplitude of the received speech signal in the spectral domain, and a final output of the FFT classifier 20.1 is the first confidence score assigned by the FFT classifier 20.1 to the received speech signal, the first confidence score being within the range from 0 to 1, for example 0.2323.

The DCT classifier 20.2 is configured to perform the following main actions or operations:
(i) segmenting or dividing the received speech signal into overlapping or non-overlapping frames;
(ii) applying a Discrete cosine transform (DCT) to the each speech signal frame to extract DCT features therefrom, wherein the DCT features extracted for each speech signal frame are presented as a DCT feature vector carrying DCT features of the speech signal frame and having a dimensionality of 64, 128 or 256;
(iii) concatenating the DCT feature vectors, each DCT feature vector corresponding to a particular speech signal frame, into a DCT feature matrix;
(iv) feeding the DCT feature matrix corresponding to the speech signal to a pre-trained deep neural network to assign a first confidence score to the speech signal based on the DCT features presented in the fed DCT feature matrix.

Please note that the confidence score assigned by the DCT classifier 20.2 is referred to in the present document as a second confidence score to distinguish it from other confidence scores assigned by other classifiers disclosed therein, and the deep neural network used in the DCT classifier 20.2 is referred to in the present document as a second deep neural network to distinguish it from another deep neural networks used by the FFT classifier 20.1.

Unless the context otherwise required, the DCT features extracted from the received speech signal by the DCT classifier 20.2 may be also referred to in the present document as frequency-domain features, spectral features or DCT features, and the feature matrix obtained by the DCT classifier 20.2 may be also referred to in the present document as a second frequency-domain feature matrix, a second spectral feature matrix or a DCT feature matrix.

In one embodiment of the present invention, the DCT classifier 20.2 may be divided into a group of interconnected functional sub-modules according to the above-mentioned functionalities of the DCT classifier 20.2: a framing sub-module configured to perform the above operation (i) of the DCT classifier 20.2, and a feature extraction sub-module connected to the framing sub-module and configured to perform the above operations (ii), (iii) of the DCT classifier 20.2, and a score assignment sub-module connected to the feature extraction sub-module and configured to perform the above operation (iv) of the DCT classifier 20.2.

In another embodiment of the present invention, the speech signal to be processed by the DCT classifier 20.2 may be divided by the DCT classifier 20.2 into overlapping, equal-length frames. In another embodiment of the present invention, the speech signal to be processed by the DCT classifier 20.2 may be divided by the DCT classifier 20.2 into non-overlapping, equal-length frames.

The above operation (ii) performed by the DCT classifier 20.2 includes calculating a Discrete cosine transform (DCT) for each speech signal frame as obtained as a result of the operation (i) performed by the DCT classifier 20.2, wherein the extracted DCT features are actually a second set of speech signal features used by the spoofing-detection module 20 to make a final decision on whether the processed speech signal is spoofed or genuine.

It is to note that the Discrete cosine transform (DCT) used by the DCT classifier 20.2 when performing the operation (ii) is discrete transform which kernel is defined by the cosine function and which produces spectrum analysis. In particular, DCT expresses a finite sequence of data points in terms of a sum of cosine functions oscillating at different frequencies.

Generally speaking, the DCT is a Fourier-related transform similar to the discrete Fourier transform (DFT), but using only real numbers. DCTs are equivalent to DFTs of roughly twice the length, operating on real data with even symmetry (since the Fourier transform of a real and even function is real and even), whereas in some variants the input and/or output data are shifted by half a sample.

For example, if $x=[x(0), x(1), \ldots, x(N-1)]^T$, with T denoting column vector, x represents a frame of speech samples applied as an input to a speech coder. x is transformed into a vector $X=[X(0), X(1), \ldots, X(N-1)]^T$, where N denotes the number of coefficients.

$$X(k) = b(k)\sum_{j=0}^{N-1} x(j)\cos\frac{\pi(2j-1)(k-1)}{2N},$$

where $k=0, 1, \ldots, N-1$,
where all the coefficients are real numbers and $$b(k) = \begin{cases} \frac{1}{\sqrt{N}}, k=0 \\ \sqrt{\frac{2}{N}}, k=1, 2, \ldots, N-1 \end{cases}$$

The DCT used by the DCT classifier 20.2 when performing the operation (ii) allows the DCT classifier 20.2 to transform each speech signal frame as obtained by the DCT classifier 20.2 when performing the operation (i) from the spatial domain to the frequency domain.

Therefore, the DCT algorithm used in the DCT classifier 20.2 converts the received speech signal to a sequence or set of DCT feature vectors, each DCT feature vector carrying frequency-domain features of a corresponding speech signal frame. In other words, the DCT algorithm used in the DCT classifier 20.2 returns or outputs a set of DCT features found in each frame comprised in the speech signal.

Then, the DCT classifier 20.2 performs the operation (iii), in particular concatenates the DCT feature vectors into a resulting DCT feature matrix representing the speech signal, the DCT feature vectors being obtained as a result of the operation (ii) performed by the DCT classifier 20.2 and each corresponding to a particular speech signal frame.

When the above operation (iv) of the DCT classifier 20.2 is performed, the DCT feature matrix corresponding to the speech signal is to be fed to the second deep neural network (DNN) to assign the first confidence score to the speech signal based on the DCT features presented in the fed DCT feature matrix, wherein the used second deep neural network (DNN) is to be pre-trained on pre-extracted DCT features of a plurality of spoofed speech signals and on pre-extracted DCT features of a plurality of genuine speech signals to detect which DCT features of the pre-extracted DCT features influence the spoofed speech signal and the genuine speech signal and to estimate the strength of said influence. Therefore, the pre-trained second DNN used in the DCT classifier 20.2 is configured to analyze or process the received DCT features of the speech signal to find out whether the speech signal is to be regarded rather as spoofed than genuine or vice versa and to assign the first confidence score in a range of [0; 1] depending on the DCT features processed. If the first confidence score assigned by the DCT classifier 20.2 is equal to 0, it means that the DCT features correspond to a completely spoofed speech signal. And vice versa, if the first confidence score assigned by the DCT classifier 20.2 is equal to 1, it means that the DCT features correspond to a completely genuine speech signal. As an example, if the first confidence score assigned by the DCT classifier 20.2 is equal to 0.2323 (corresponds to a low confidence level), it means that the speech signal having the DCT features processed by the second DNN in the DCT classifier 20.2 is much rather spoofed than genuine since the value of the assigned first confidence score is much closer to 0 than to 1.

Therefore, as described above, the DCT classifier 20.2 allows analyzing the phase of the received speech signal, and a final output of DCT classifier 20.2 is the second confidence score assigned by the DCT classifier 20.2 to the received speech signal, the second confidence score being within the range from 0 to 1, for example 0.1534.

It is to further note that the first confidence score assigned by the FFT classifier 20.1 and the second confidence score assigned by the DCT classifier 20.2 are always correlated: 0.2323 and 0.1534 for a first audio file containing a speech signal; 0.9492 and 0.9731 for a second audio file containing another speech signal; 0.0252 and 0.3457 for a third audio file containing still another speech signal.

Finally, the DCN classifier 20.3 is configured to perform the following main actions or operations:

(i) applying a Deep convolutional network (DCN) based on an end-to-end architecture to the speech signal to assign a confidence score to the speech signal, wherein the end-to-end architecture used as a basis for the Deep convolutional network (DCN) applied by the DCN classifier 20.3 is preferably well-known SoundNet architecture.

For example, a series of one-dimensional convolutions followed by nonlinearities (i.e. ReLU layer) may be used for processing the received speech signal. In particular, a five-layer or eight-layer convolutional network may be used as the DCN.

Please note that the confidence score assigned by the DCN classifier 20.3 is referred to in the present document as a third confidence score to distinguish it from other confidence scores assigned by other classifiers disclosed therein.

It is to note that the Deep convolutional network (DCN) is to be pre-trained on a plurality of spoofed speech signals and a plurality of genuine speech signals to classify speech signals in the terms of their confidence.

The Deep convolutional network (DCN) used by the DCN classifier 20.3 takes the speech signal as PCM samples and detects how much the processed speech signal is confident, thereby assigning the third confidence score to the speech signal in a range of [0; 1].

The decision maker 20.4 connected to each of the FFT classifier 20.1, DCT classifier 20.2 and the DCN classifier 20.3 receives the first confidence score, the second confidence score and the third confidence score therefrom, respectively.

The decision maker 20.4 is configured to compute a resulting or total confidence score based on the received first, second and third confidence scores by using any known appropriate mathematical or statistical method.

In one embodiment of the present invention, the decision maker 20.4 may be configured to compute a total confidence score by calculating an average value of the three confidence scores assigned to the same speech signal processed by the FFT classifier 20.1, DCT classifier 20.2 and the DCN classifier 20.3, respectively. In other words, the total confidence score may be the average value of the first confidence score, the second confidence score and the third confidence score.

In another embodiment of the present invention, the decision maker 20.4 may be configured to compute the total confidence score by linearly weighting the three confidence scores assigned to the same speech signal processed by the FFT classifier 20.1, DCT classifier 20.2 and the DCN classifier 20.3, respectively. In other words, the total confidence score may be the linearly weighted score based on the combination of the first confidence score weighted, the second confidence score weighted and the third confidence score weighted.

In still another embodiment of the present invention, the decision maker 20.4 may be configured to compute a total confidence score by calculating a non-linear generalized metric $SF=\text{logit}(\log(S141-S1))+\log(S2/(1-S2))+\log(S3/(1-S3)))$, where logit—a logic function, S1—the first confidence score assigned by the FFT classifier 20.1, S2—the second confidence score assigned by the DCT classifier 20.2, and S3—the third confidence score assigned by the DCN classifier 20.3.

Therefore, the decision maker 20.4 merges or combines the individual confidence scores assigned to the speech signal by the classifiers 20.1, 20.2, 20.3.

The decision maker 20.4 is further configured to compare the computed total confidence score to a predefined threshold stored in the local data storage 40 and retrieved therefrom by the decision maker 20.4 to make a final decision on whether the received speech signal is spoofed or genuine.

In other embodiments of the present invention, the decision maker 20.4 may be further configured to perform the following operations: (a) weighting the first confidence score assigned by the FFT classifier 20.1 by using a first weight coefficient pre-determined for any confidence scores assigned by the FFT classifier 20.1 and stored in the local data storage 40, and (b) weighting the second confidence score assigned by the DCT classifier 20.2 by using a second weight coefficient pre-determined for any confidence scores assigned by the DCT classifier 20.2 and stored in the local data storage 40, and (c) weighting the third confidence score assigned by the DCN classifier 20.3 by using a third weight coefficient pre-determined for any confidence scores assigned by the DCN classifier 20.3 and stored in the local data storage 40, and (d) summarizing or averaging the weighted confidence scores to calculate a resultant weighted confidence score, and (e) comparing the resultant weighted confidence score to a pre-determined threshold stored in the local data storage 40 to make a final decision on whether the received speech signal is spoofed or genuine.

Therefore, the speech-processing device 100 provides the above-described hybrid approach for detecting spoofing attacks taken by using speech signals, the hybrid approach being based on using the Fast Fourier Transform (FFT), the Discrete cosine transform (DCT) and the pre-trained deep convolutional network (DCN).

In one embodiment of the present invention, the FFT classifier 20.1, the DCT classifier 20.2 and the DCN classifier 20.3 may be realized as a score assignment module having all the above-described functionalities of the classifiers 20.1, 20.2 and 20.3, wherein the decision maker 20.4 may be realized as a spoofing-detection module having all the above-described functionalities of the decision maker 20.4. In such embodiment of the present invention, each of the score assignment module having the functionalities of the classifiers 20.1, 20.2 and 20.3 and the spoofing-detection module having the functionalities of the decision maker 20.4 may be implemented as a single processor, such as a common processor or a special-purpose processor (e.g., a digital signal processor, an application-specific integrated circuit, or the like).

Figure 3:
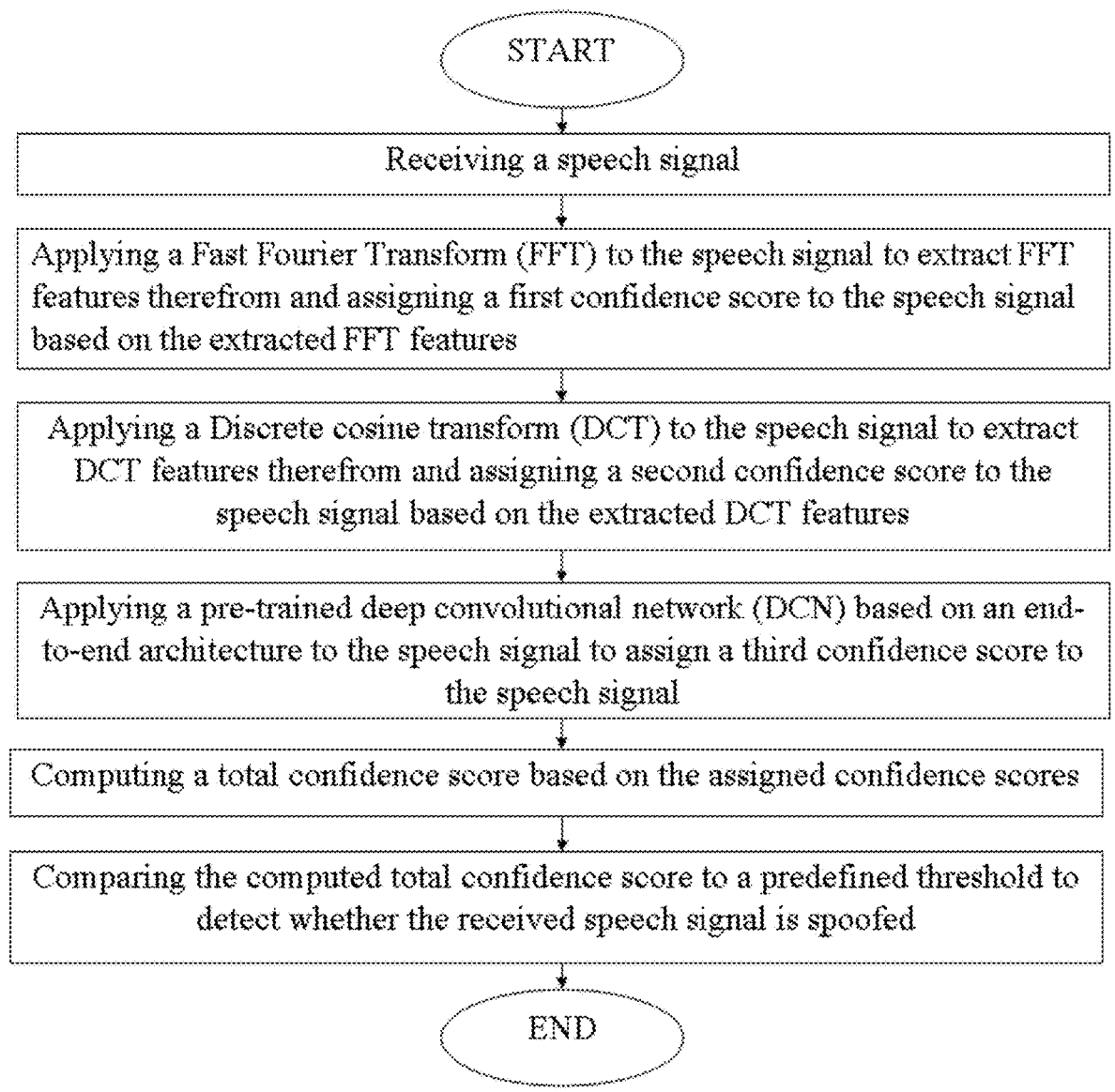
FIG. 3 shows a flow diagram of a method of detecting a spoofing attack according to a second aspect of the present invention.

FIG. 3 illustrates a flow diagram of a method of detecting a spoofing attack according to a second aspect of the present invention.

The method of FIG. 3 is implemented by the above the speech-processing device 100. Anyway, the method of FIG. 3 may be implemented by any computing or electronic device known in the art, in particular by a processing unit of the above-mentioned common computer.

The method of FIG. 3 comprises the following stages or steps:
(1) receiving a speech signal;
(2) computing a first confidence score of the received speech signal by using the FFT, the computing step (2) including:
  (i) segmenting or dividing the received speech signal into overlapping or non-overlapping frames;
  (ii) applying a Fast Fourier Transform (FFT) to the each speech signal frame to extract corresponding FFT features therefrom, wherein the FFT features extracted for each speech signal frame are presented as a FFT feature vector carrying FFT features of the speech signal frame and having a dimensionality of 64, 128 or 256;
  (iii) concatenating the FFT feature vectors, each FFT feature vector corresponding to a particular speech signal frame, into a FFT feature matrix;
  (iv) feeding the FFT feature matrix corresponding to the speech signal to a pre-trained deep neural network to assign the first confidence score to the speech signal based on the FFT features presented in the fed FFT feature matrix.
(3) computing a second confidence score of the received speech signal by using the DCT, the computing step (3) including:
  (i) segmenting or dividing the received speech signal into overlapping or non-overlapping frames;
  (ii) applying a Discrete cosine transform (DCT) to the each speech signal frame to extract DCT features therefrom, wherein the DCT features extracted for each speech signal frame are presented as a DCT feature vector carrying DCT features of the speech signal frame and having a dimensionality of 64, 128 or 256;
  (iii) concatenating the DCT feature vectors, each DCT feature vector corresponding to a particular speech signal frame, into a DCT feature matrix;
  (iv) feeding the DCT feature matrix corresponding to the speech signal to a pre-trained deep neural network to assign the second confidence score to the speech signal based on the DCT features presented in the fed DCT feature matrix.
(4) computing a third confidence score of the received speech signal by using the DCN, the computing step (4) including:
  (i) applying a Deep convolutional network (DCN) based on an end-to-end architecture to the speech signal to assign a confidence score to the speech signal, wherein the end-to-end architecture used as a basis for the Deep convolutional network (DCN) applied by the DCN classifier 20.3 is preferably well-known SoundNet architecture;
(5) computing a total confidence score based on the assigned confidence scores; and
(6) comparing the computed total confidence score to a predefined threshold to detect whether the received speech signal is spoofed.

Figure 4:
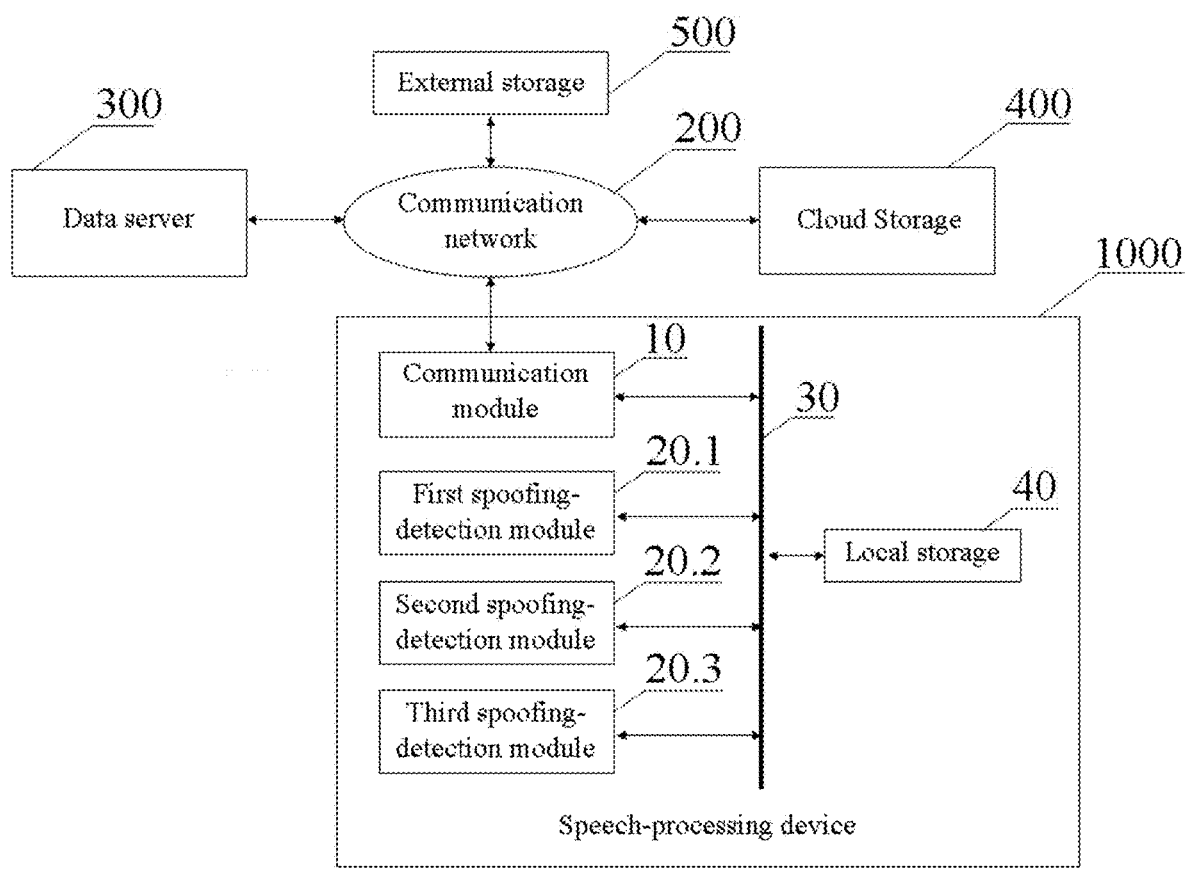
FIG. 4 shows a block diagram of a speech-processing device for detecting a spoofing attack according to a third aspect of the present invention.

FIG. 4 is a block diagram illustrating a speech-processing device 1000 according to a third aspect of the present invention. Generally speaking, the speech-processing device 1000 according to the third aspect of the present invention is similar to the above-described speech-processing device 100 according to the first aspect of the present invention, i.e. the speech-processing device 1000 has a structure and interconnections similar to that of the speech-processing device 100. In view of the above-mentioned similarity between the speech-processing device 1000 illustrated in FIG. 4 and the speech-processing device 100 illustrated in FIG. 1, some details are omitted below and provided as a reference to corresponding description of the speech-processing device 100.

In the speech-processing device 1000 according to a third aspect of the present invention, the spoofing-detection module 20 used in the speech-processing device 100 according to the first aspect of the present invention is replaced with a first spoofing-detection module 21, a second spoofing-detection module 22, and a third spoofing-detection module 23 (see FIG. 4), wherein the first, second and third spoofing-detection modules 21, 22, 23 are connected with each other via the communication bus 30. Functionalities of the first, second and third spoofing-detections modules 21, 22, 23 are described below with reference to the above-described spoofing-detection module 20 of the speech-processing device 100. It is to note that each of the first, second and third spoofing-detections modules 21, 22, 23 may be implemented as one of the above possible implementations of the spoofing-detection module 20. Please note that the above-described functionalities of the decision maker 20.4 are actually divided or distributed between the first, second and third spoofing-detection modules 21, 22, 23, wherein a resulting or final decision on whether the speech signal received by the communication module 10 may be made or adopted by any of the first, second and third spoofing-detection modules 21, 22, 23.

Meanwhile, the first spoofing-detection module 21 may be connected to the above-described communication module 10 via the communication bus 30 to receive the speech signal therefrom and connected to the local storage 40 via the communication bus 30 to receive all the required data therefrom. In particular, the first spoofing-detection module 21 may perform the following operations completely corresponding to that of the FFT classifier 20.1:
(i) segmenting or dividing the received speech signal into overlapping or non-overlapping frames;
(ii) applying a Fast Fourier Transform (FFT) to the each speech signal frame to extract corresponding FFT features therefrom, wherein the FFT features extracted for each speech signal frame are presented as a FFT feature vector carrying FFT features of the speech signal frame and having a dimensionality of 64, 128 or 256;
(iii) concatenating the FFT feature vectors, each FFT feature vector corresponding to a particular speech signal frame, into a FFT feature matrix;
(iv) feeding the FFT feature matrix corresponding to the speech signal to a pre-trained deep neural network (DNN) to assign a first confidence score to the speech signal based on the FFT features presented in the fed FFT feature matrix.

In addition to the above functional operations, the first spoofing-detection module 21 may further perform the following operation or action: (v) comparing the first confidence score assigned to the speech signal by the first spoofing-detection module 21 to a predefined threshold stored in the local data storage 40 and retrieved therefrom by the first spoofing-detection module 21 in order to detect whether the speech signal received by the first spoofing-detection module 21 from the communication module 10 is spoofed. In case when the speech signal is detected by the first spoofing-detection module 21 as not spoofed, the first spoofing-detection module 21 transmits the first confidence score assigned by the first spoofing-detection module 21 to the speech signal to the second spoofing-detection module 22.

The second spoofing-detection module 22 may be connected to the above-described communication module 10 via the communication bus 30 to receive the speech signal therefrom and connected to the local storage 40 via the communication bus 30 to receive all the required data therefrom. Furthermore, the second spoofing-detection module 22 may be further connected to the first spoofing-detection module 21 via the communication bus 30 to receive the assigned first confidence score therefrom.

In particular, the second spoofing-detection module 22 may perform the following operations completely corresponding to that of the DCT classifier 20.2:
(i) segmenting or dividing the received speech signal into overlapping or non-overlapping frames;
(ii) applying a Discrete cosine transform (DCT) to the each speech signal frame to extract DCT features therefrom, wherein the DCT features extracted for each speech signal frame are presented as a DCT feature vector carrying DCT features of the speech signal frame and having a dimensionality of 64, 128 or 256;
(iii) concatenating the DCT feature vectors, each DCT feature vector corresponding to a particular speech signal frame, into a DCT feature matrix;
(iv) feeding the DCT feature matrix corresponding to the speech signal to a pre-trained deep neural network to assign a second confidence score to the speech signal based on the DCT features presented in the fed DCT feature matrix.

In addition to the above functional operations, the second spoofing-detection module 22 may further perform the following operations or actions: (v) computing a first total confidence score based on the received first confidence score and the assigned second confidence score; (vi) comparing the first total confidence score computed by the second spoofing-detection module 22 to a predefined threshold stored in the local data storage 40 and retrieved therefrom by the second spoofing-detection module 22 in order to detect again whether the speech signal received by the second spoofing-detection module 22 from the communication module 10 is spoofed.

It is to further note that the first total confidence score may be computed by the second spoofing-detection module 22 by using, for example, one of the below-described methods:
(1) calculating an average value of the confidence scores assigned to the same speech signal processed by the first spoofing-detection module 21 and the second spoofing-detection module 22, respectively. In other words, the first total confidence score may be the average value of the first confidence score assigned by the first spoofing-detection module 21 and the second confidence score assigned by the second spoofing-detection module 22;
(2) linearly weighting the confidence scores assigned to the same speech signal processed by the first spoofing-detection module 21 and the second spoofing-detection module 22, respectively. In other words, the first total confidence score may be the linearly weighted score based on the combination of the first confidence score weighted and the second confidence score weighted;
(3) calculating a non-linear generalized metric $SF=\text{logit}(\log(S1/(1-S1))+\log(S2/(1-S2)))$, where logit—a logic function, S1—the first confidence score assigned by the first spoofing-detection module, and S2—the second confidence score assigned by the second spoofing-detection module 22.

In case when the speech signal is still detected by the second spoofing-detection module 22 as not spoofed, the second spoofing-detection module 22 transmits the computed first total confidence score to the third spoofing-detection module 23.

In some embodiments of the third aspect of the present invention, the above-described functionalities of the first spoofing-detection module 21 may be realized by the second spoofing-detection module 22, and the above-described functionalities of the second spoofing-detection module 22 may be realized by the first spoofing-detection module, wherein the FFT features extracted by the first spoofing-detection module 21 may be referred to as a first set of signal features, and the DCT features extracted by the second spoofing-detection module 22 may be referred to as a second set of signal features.

The second spoofing-detection module 22 may be connected to the above-described communication module 10 via the communication bus 30 to receive the speech signal therefrom and connected to the local storage 40 via the communication bus 30 to receive all the required data therefrom. Furthermore, the second spoofing-detection module 22 may be further connected to the second spoofing-detection module 22 via the communication bus 30 to receive the assigned first total confidence score therefrom.

In particular, the second spoofing-detection module 22 may perform the following operation completely corresponding to that of the DCN classifier 20.3:
(i) applying a Deep convolutional network (DCN) based on an end-to-end architecture to the speech signal received from the communication module 10 to assign a third confidence score to the speech signal, wherein the end-to-end architecture used as a basis for the Deep convolutional network (DCN) applied by the second spoofing-detection module 22 is preferably well-known SoundNet architecture.

In addition to the above functional operation, the second spoofing-detection module 22 may further perform the following operations or actions: (ii) computing a second total confidence score based on the received first total confidence score and the assigned third confidence score; (iii) comparing the second total confidence score computed by the second spoofing-detection module 22 to a predefined threshold stored in the local data storage 40 and retrieved therefrom by the second spoofing-detection module 22 in order to finally detect whether the speech signal received by the second spoofing-detection module 22 from the communication module 10 is actually spoofed or not spoofed.

It is to further note that the second total confidence score may be computed by the second spoofing-detection module 22 by using, for example, one of the below-described methods:
(1) calculating an average value of the third confidence score assigned to the speech signal processed by the second spoofing-detection module 22 and the first total second confidence score computed by the second spoofing-detection module 22 for the same speech signal;
(2) calculating a linearly weighted score based on the combination of the weighted third confidence score assigned to the speech signal processed by the second spoofing-detection module 22 and the weighted first total second confidence score computed by the second spoofing-detection module 22 for the same speech signal;
(3) calculating a non-linear generalized metric SF=logit(log(S1/(1−S1))+log(S2/(1−S2))), where logit—a logic function, S1—the third confidence score assigned by the third spoofing-detection module 23, and S2—the first total second confidence score computed by the second spoofing-detection module 22 for the same speech signal.

Therefore, a final decision on whether the processed speech signal is spoofed or genuine is made by the above third spoofing-detection module 23.

In particular, as described above in details, if the speech signal is not detected by the first spoofing-detection module 21 as spoofed, the second spoofing-detection module 22 processes the same speech signal to detect whether it is spoofed with due consideration of the decision adopted by the first spoofing-detection module. Further, if the second spoofing-detection module 22 fails to detect the speech signal as spoofed, the second spoofing-detection module 22 is finally used to detect whether the speech signal is spoofed with due consideration of the decision adopted by the second spoofing-detection module 22. However, if none of the first, second and third spoofing-detection modules 23 fail to detect the processed speech signal as spoofed, it is finally regarded as genuine.

Figure 5:
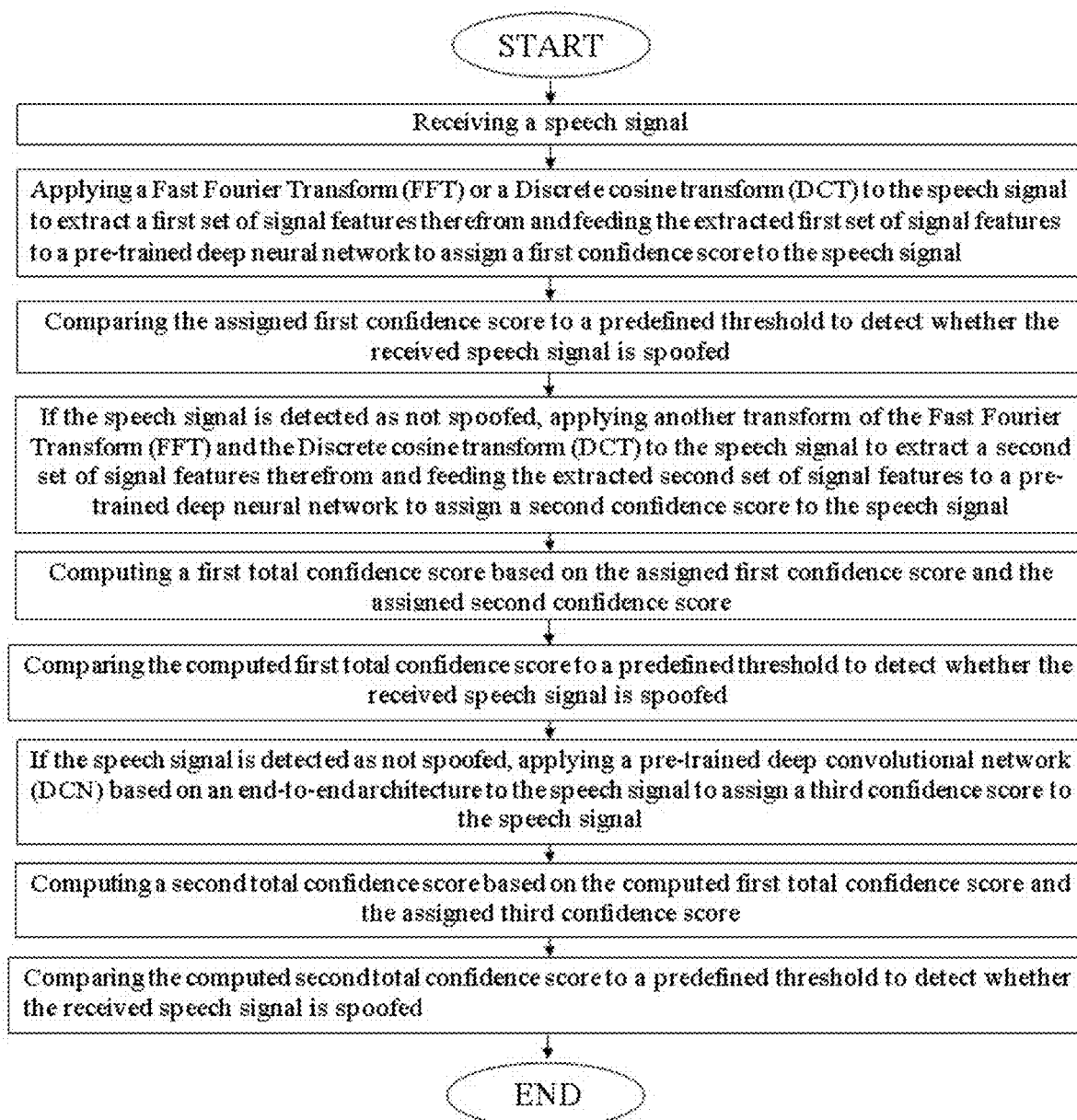
FIG. 5 illustrates a flow diagram of a method of detecting a spoofing attack according to a fourth aspect of the present invention.

FIG. 5 illustrates a flow diagram of a method of detecting a spoofing attack according to a fourth aspect of the present invention.

The method of FIG. 5 is implemented by the above the speech-processing device 1000 shown in FIG. 4. Anyway, the method of FIG. 5 may be implemented by any computing or electronic device known in the art, in particular by a processing unit of the above-mentioned common computer.

The method of FIG. 5 comprises the following stages or steps:
(1) receiving a speech signal;
(2) computing a first confidence score of the received speech signal by using the first spoofing-detection module, the computing step (2) including:
(i) segmenting or dividing the received speech signal into overlapping or non-overlapping frames;
(ii) applying a Fast Fourier Transform (FFT) or a Discrete cosine transform (DCT) to the each speech signal frame to extract a first set of signal features therefrom, wherein the first set of signal features for each speech signal frame is presented as a feature vector carrying FFT OR DCT features of the speech signal frame and having a dimensionality of 64, 128 or 256;
(iii) concatenating the feature vectors, each feature vector corresponding to a particular speech signal frame, into a feature matrix;
(iv) feeding the feature matrix corresponding to the speech signal to a pre-trained deep neural network to assign the first confidence score to the speech signal based on the signal features presented in the fed feature matrix;
(v) comparing the assigned first confidence score to a predefined threshold to detect whether the received speech signal is spoofed;
(3) if the speech signal is detected at the above computing step (2) as not spoofed, computing a first total confidence score of the received speech signal by using the second spoofing-detection module, the computing step (3) including:
(v) segmenting or dividing the received speech signal into overlapping or non-overlapping frames;
(vi) applying another transform of the Fast Fourier Transform (FFT) and the Discrete cosine transform (DCT) to the each speech signal frame to extract a second set of signal features therefrom, wherein the second set of signal features for each speech signal frame is presented as a feature vector carrying DCT OR FFT features of the speech signal frame and having a dimensionality of 64, 128 or 256;
(vii) concatenating the feature vectors, each feature vector corresponding to a particular speech signal frame, into a feature matrix;
(vi) feeding the feature matrix corresponding to the speech signal to a pre-trained deep neural network to assign a second confidence score to the speech signal based on the signal features presented in the fed feature matrix;
(vii) computing the first total confidence score based on the assigned first confidence score and the assigned second confidence score;
(viii) comparing the computed first total confidence score to a predefined threshold to detect whether the received speech signal is spoofed;
(4) if the speech signal is still detected at the above computing step (3) as not spoofed, computing a second total confidence score of the received speech signal by using the third spoofing-detection module, the computing step (4) including:
(i) applying a Deep convolutional network (DCN) based on an end-to-end architecture to the speech signal to assign a third confidence score to the speech signal, wherein the end-to-end architecture used as a basis for the Deep convolutional network (DCN) applied by the third spoofing-detection module is preferably well-known SoundNet architecture;

(ii) computing a second total confidence score based on the computed first total confidence score and the assigned third confidence score; and (iii) comparing the computed second total confidence score to a predefined threshold to finally detect whether the received speech signal is spoofed.

Experiments

Inventors have conducted some experiments in order to evaluate an individual performance in the terms of spoofing attack detection accuracy as provided by each of the by the FFT classifier 20.1, DCT classifier 20.2, the DCN classifier 20.3 and a resulting performance in the terms of spoofing attack detection accuracy as provided by the speech-processing device 100 using the combination of the above classifiers 20.1, 20.2, 20.3.

Results of the conducted experiments are as follows. The accuracy of spoofing attack detection as provided by the FFT classifier 20.1 is 90.2%, and the accuracy of spoofing attack detection as provided by the DCT classifier 20.2 is 93.7%, and the accuracy of spoofing attack detection as provided by the DCN classifier 20.3 is 81.6%, and the accuracy of spoofing attack detection as provided by the speech-processing device 100 is 95.6%. The increased accuracy provided by the speech-processing device 100 is conditioned by the synergistic effect provided by combining different approaches using different sets of speech signal features. Therefore, an improved hybrid model or approach providing the increased accuracy for spoofed speech signals has been developed.

It will be apparent to one of skill in the art that described herein is a novel system method and apparatus for free keystroke biometric authentication. While the invention has been described with reference to specific preferred embodiments, it is not limited to these embodiments. The invention may be modified or varied in many ways and such modifications and variations, as would be obvious to one of skill in the art, are within the scope and spirit of the invention and are included within the scope of the following claims.

The invention claimed is:

1. A method of detecting a spoofing attack, the method being executed on a computing device, comprising:
    receiving a speech signal;
    applying a Fast Fourier Transform (FFT) to the speech signal to extract FFT features therefrom and feeding the extracted FFT features to a pre-trained deep neural network to assign a first confidence score to the speech signal;
    applying a Discrete cosine transform (DCT) to the speech signal to extract DCT features therefrom and feeding the extracted DCT features to a pre-trained deep neural network to assign a second confidence score to the speech signal;
    applying a pre-trained deep convolutional network (DCN) based on an end-to-end architecture to the speech signal to assign a third confidence score to the speech signal;
    computing a total confidence score based on the assigned confidence scores; and
    comparing the computed total confidence score to a predefined threshold to detect whether the received speech signal is spoofed.

2. The method of claim 1, further comprising dividing the received speech signal into frames.

3. The method of claim 2, wherein applying the Fast Fourier Transform (FFT) to the speech signal includes applying the Fast Fourier Transform (FFT) to each speech signal frame, wherein the FFT features fed to the pre-trained deep neural network are a FFT feature matrix obtained by concatenating the frequency-domain feature vectors corresponding to each of the speech signal frames.

4. The method of claim 2, wherein applying the Discrete cosine transform (DCT) to the speech signal includes applying the Discrete cosine transform (DCT) to each speech signal frame, wherein the DCT features fed to the pre-trained deep neural network are a DCT feature matrix obtained by concatenating the frequency-domain feature vectors corresponding to each of the speech signal frames.

5. The method of claim 1, wherein the end-to-end architecture used in the deep convolutional network (DCN) is the SoundNet architecture.

6. A speech-processing device for detecting a spoofing attack, the device comprising:
    a communication module for receiving a speech signal; and
    a spoofing-detection module connected to the communication module to receive the speech signal therefrom and configured to perform the following operations:
        apply a Fast Fourier Transform (FFT) to the speech signal to extract FFT features therefrom and feed the extracted FFT features to a pre-trained deep neural network to assign a first confidence score to the speech signal;
        apply a Discrete cosine transform (DCT) to the speech signal to extract DCT features therefrom to a pre-trained deep neural network and feed the extracted DCT features to assign a second confidence score to the speech signal;
        apply a pre-trained deep convolutional network (DCN) based on an end-to-end architecture to the speech signal to assign a third confidence score to the speech signal;
        compute a total confidence score based on the received confidence scores; and
        compare the computed total confidence score to a predefined threshold to detect whether the received speech signal is spoofed.

7. A speech-processing device for detecting a spoofing attack, the device comprising:
    a communication module for receiving a speech signal;
    a first spoofing-detection module connected to the communication module to receive the speech signal therefrom and configured to perform the following operations:
        apply a Fast Fourier Transform (FFT) or a Discrete cosine transform (DCT) to the speech signal to extract a first set of signal features therefrom;
        feed the extracted first set of signal features to a pre-trained deep neural network to assign a first confidence score to the speech signal; and
        compare the assigned first confidence score to a first predefined threshold to detect whether the received speech signal is spoofed;
    a second spoofing-detection module connected to the communication module to receive the speech signal therefrom and connected to the first spoofing-detection module to receive the assigned first confidence score therefrom when the speech signal is detected by the first spoofing-detection module as not spoofed, wherein the second spoofing-detection module is configured to perform the following operations:

apply another transform of the Fast Fourier Transform (FFT) and the Discrete cosine transform (DCT) to the speech signal to extract a second set of signal features therefrom; and feed the extracted second set of signal features to a pre-trained deep neural network to assign a second confidence score to the speech signal;

compute a first total confidence score based on the received first confidence score and the assigned second confidence score;

compare the computed first total confidence score to a second predefined threshold to detect whether the received speech signal is spoofed;

a third spoofing-detection module connected to the communication module to receive the speech signal therefrom and connected to the second spoofing-detection module to receive the computed first total confidence score therefrom when the speech signal is detected by the second spoofing-detection module as not spoofed, wherein the third spoofing-detection module is configured to perform the following operations:

applying a pre-trained deep convolutional network (DCN) based on an end-to-end architecture to the speech signal to assign a third confidence score to the speech signal;

computing a second total confidence score based on the received first total confidence score and the assigned third confidence score;

comparing the computed second total confidence score to a third predefined threshold to detect whether the received speech signal is spoofed.

8. A method of detecting a spoofing attack, the method being executed on a computing device, comprising:

receiving a speech signal;

applying a Fast Fourier Transform (FFT) or a Discrete cosine transform (DCT) to the speech signal to extract a first set of signal features therefrom and feeding the extracted first set of signal features to a pre-trained deep neural network to assign a first confidence score to the speech signal;

comparing the assigned first confidence score to a first predefined threshold to detect whether the received speech signal is spoofed;

if the speech signal is detected as not spoofed, applying another transform of the Fast Fourier Transform (FFT) and the Discrete cosine transform (DCT) to the speech signal to extract a second set of signal features therefrom and feeding the extracted second set of signal features to a pre-trained deep neural network to assign a second confidence score to the speech signal;

computing a first total confidence score based on the assigned first confidence score and the assigned second confidence score;

comparing the computed first total confidence score to a second predefined threshold to detect whether the received speech signal is spoofed;

if the speech signal is detected as not spoofed, applying a pre-trained deep convolutional network (DCN) based on an end-to-end architecture to the speech signal to assign a third confidence score to the speech signal;

computing a second total confidence score based on the computed first total confidence score and the assigned third confidence score;

comparing the computed second total confidence score to a third predefined threshold to detect whether the received speech signal is spoofed.

* * * * *